US009631257B2

(12) United States Patent
Pisch et al.

(10) Patent No.: US 9,631,257 B2
(45) Date of Patent: Apr. 25, 2017

(54) PROCESS FOR THE TREATMENT OF A SILICATE MINERAL

(71) Applicant: LAFARGE, Paris (FR)

(72) Inventors: Alexander Pisch, Saint Quentin Fallavier (FR); Ellis Gartner, Saint Quentin Fallavier (FR); Vincent Meyer, Saint Quentin Fallavier (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 14/647,277

(22) PCT Filed: Nov. 26, 2013

(86) PCT No.: PCT/EP2013/074732
§ 371 (c)(1),
(2) Date: May 26, 2015

(87) PCT Pub. No.: WO2014/082996
PCT Pub. Date: Jun. 5, 2014

(65) Prior Publication Data
US 2015/0299823 A1    Oct. 22, 2015

(30) Foreign Application Priority Data

Nov. 27, 2012  (EP) ..................................... 12306468
Nov. 27, 2012  (EP) ..................................... 12306469

(51) Int. Cl.
*C01B 33/24*      (2006.01)
*C22B 26/22*      (2006.01)
(Continued)

(52) U.S. Cl.
CPC .............. *C22B 26/22* (2013.01); *B01D 53/62* (2013.01); *B01J 20/10* (2013.01); *B01J 20/3085* (2013.01);
(Continued)

(58) Field of Classification Search
CPC .. C22B 26/22; C22B 1/00; B01J 20/10; B01J 20/3085; C01F 5/24
(Continued)

(56) References Cited

U.S. PATENT DOCUMENTS 3,954,943 A      5/1976  Neumann et al.
4,478,796 A  * 10/1984  Lalancette ................ C01F 5/06
                                                             423/155
(Continued)

FOREIGN PATENT DOCUMENTS

EP    2 508 496 A1   10/2012
EP    2 532 624 A1   12/2012
(Continued)

OTHER PUBLICATIONS

International Search Report as issued in International Patent Application No. PCT/EP2013/074732, dated Mar. 11, 2014.
(Continued)

*Primary Examiner* — Colleen Dunn
*Assistant Examiner* — Haytham Soliman
(74) *Attorney, Agent, or Firm* — Pillsbury Winthrop Shaw Pittman LLP

(57) ABSTRACT

A process for the treatment of a silicate mineral, includes: preparing a first composition including an alkali metal magnesium orthosilicate and optionally either (i) magnesium oxide or (ii) an alkali metal silicate, by reaction, at a temperature from 500 to 1200° C., of an alkali metal carbonate compound, which compound is an alkali metal carbonate, an alkali metal bicarbonate or a mixture thereof, with a magnesium silicate, the molar ratio of alkali metal carbonate compound, expressed as alkali metal oxide of the formula $R_2O$, in which R represents an alkali metal, to magnesium silicate, expressed as silicon dioxide, of the formula $SiO_2$, being from 4:1 to 1:4, and contacting the first
(Continued)

Figure 1:
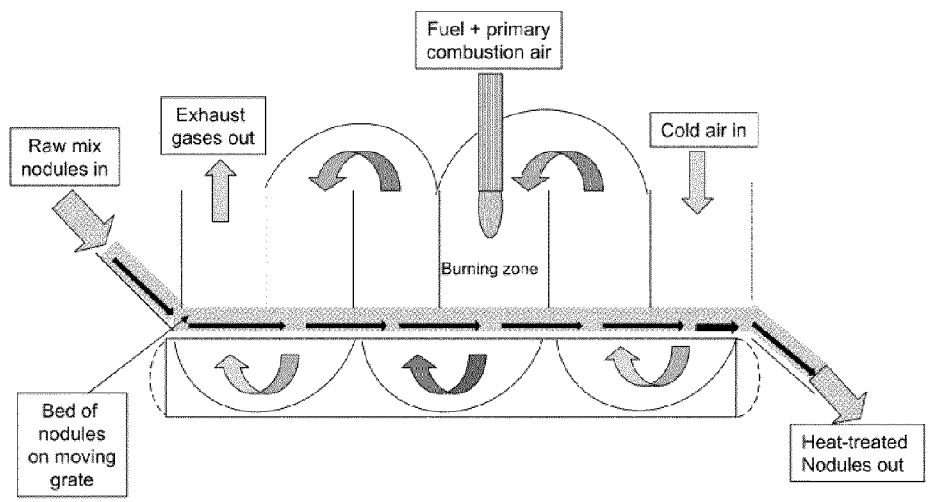

composition with water to produce a second composition comprising an amorphous magnesium silicate hydrate (M-S—H).

10 Claims, 1 Drawing Sheet

(51) Int. Cl.

| | |
|---|---|
| *B01D 53/62* | (2006.01) |
| *C01B 33/22* | (2006.01) |
| *C04B 28/10* | (2006.01) |
| *C04B 28/18* | (2006.01) |
| *C01F 5/06* | (2006.01) |
| *C01F 5/24* | (2006.01) |
| *B01J 20/10* | (2006.01) |
| *B01J 20/30* | (2006.01) |
| *C22B 1/00* | (2006.01) |

(52) U.S. Cl.
CPC ............ *C01B 33/22* (2013.01); *C01F 5/06* (2013.01); *C01F 5/24* (2013.01); *C04B 28/10* (2013.01); *C04B 28/18* (2013.01); *C22B 1/00* (2013.01); *B01D 2251/402* (2013.01); *B01D 2253/106* (2013.01); *B01D 2257/504* (2013.01); *Y02C 10/04* (2013.01); *Y02P 20/152* (2015.11); *Y02P 40/18* (2015.11)

(58) Field of Classification Search
USPC ........................................ 423/331, 155, 224
See application file for complete search history.

(56) References Cited

U.S. PATENT DOCUMENTS

| | | |
|---|---|---|
| 5,085,838 A | 2/1992 | Mason |
| 6,054,106 A | 4/2000 | Thompson et al. |
| 2004/0213705 A1 | 10/2004 | Blencoe et al. |
| 2008/0112868 A1* | 5/2008 | Blencoe ............... B01D 53/62 |
| | | 423/224 |
| 2010/0151243 A1* | 6/2010 | Glew .................... C08J 9/0066 |
| | | 428/373 |
| 2012/0291675 A1 | 11/2012 | Camire et al. |

FOREIGN PATENT DOCUMENTS

| | | |
|---|---|---|
| WO | WO 2007/069902 | 6/2007 |
| WO | WO 2009/132692 A1 | 11/2009 |
| WO | WO 2009/156740 A1 | 12/2009 |
| WO | WO 2010/097451 A2 | 9/2010 |

OTHER PUBLICATIONS

W.K. O'Connor et al., "Carbon dioxide sequestration by direct mineral carbonation: process mineralogy of feed and products," Minerals and Metallurgical Processing, vol. 19, No. 2, May 2002, XP002994928.

* cited by examiner

PROCESS FOR THE TREATMENT OF A SILICATE MINERAL

CROSS-REFERENCE TO RELATED APPLICATIONS

This is the U.S. National Stage of PCT/EP2013/074732, filed Nov. 26, 2013, which in turn claims priority to European Patent Application No. 12306468.5, filed Nov. 27, 2012 and European Patent Application No. 12306469.3, filed Nov. 27, 2012, the entire contents of these applications are incorporated herein by reference in their entireties.

This invention relates to a process for the treatment of a silicate mineral. The process uses as starting material a magnesium silicate and produces an anhydrous product comprising an alkali metal magnesium orthosilicate which is then treated with water to obtain a product comprising amorphous magnesium silicate hydrate which can be subjected to further treatments to produce other products.

Magnesium silicate rocks make up the majority of the Earth's mantle, and large surface deposits of such rocks are also found in many locations. The composition of the Earth's mantle is about 70% basic magnesium orthosilicate ($Mg_2SiO_4$), and, when this material is found in crystalline form close to the Earth's surface, it is generally in the form of olivine, which is essentially a solid solution between forsterite (pure $Mg_2SiO_4$) and fayalite (pure $Fe_2SiO_4$), representing the two main components of the Earth's mantle. In the Earth's crust, in addition to olivine, anhydrous magnesium silicates also occur as pyroxenes, such as enstatite ($MgSiO_3$). Due to the action of water, either at the surface or at depth within the Earth's crust, anhydrous magnesium silicates are converted into common magnesium silicate hydrate minerals such as serpentine (with the idealised overall composition $Mg_3Si_2O_5(OH)_4$), and also talc (with the idealised overall composition ($Mg_3Si_4O_{10}(OH)_2$).

Magnesium silicate rocks constitute an excellent source of two important elements, magnesium and silicon, in their oxide forms (MgO and $SiO_2$). Processes to extract these two oxides from such rocks have heretofore been excessively energy-intensive and thus have not been commercialized.

Although the magnesium silicate minerals tend to be very "unreactive," (e.g. in that they have high melting points and also dissolve only very slowly in water or dilute acids), it is known that they will react rapidly with molten alkali metal carbonates, such as sodium carbonate ($Na_2CO_3$). Such a process, commonly referred to as a "carbonate fusion", is often used in the preparation of minerals for chemical analysis. Generally, a large excess of solid alkali metal carbonate (typically at least ten parts of alkali metal carbonate to one part of magnesium silicate rock) is added and the mixture heated to well above the melting point of the alkali metal carbonate. The magnesium silicate completely dissolves in the resulting melt, which after cooling, can easily and rapidly be dissolved in a strong aqueous acid and the solution then analyzed by standard chemical techniques, thus allowing for total elemental analysis of the rock. The carbonate fusion process is a small scale process; it is analytical, not preparative, and is not energy-efficient as it involves melting a large excess of alkali metal carbonate in order to fully dissolve the magnesium silicate.

The term sodium magnesium silicate is sometimes used, in accordance with the International Nomenclature of Cosmetic Ingredients (INCI) to identify synthetic hectorites in the form of nanoparticles and which form clear gels in water. According to one manufacturer of such products hectorites have the formula $(Mg_{5.2}Li_{0.8})(Si_8)O_{20}(OH)_4Na_{0.8}$.

The present invention seeks to provide a process for the production from magnesium silicate rock of alkali metal magnesium orthosilicates and magnesium oxide and/or alkali metal silicates which can be used subjected to chemical to capture carbon dioxide ($CO_2$) and which can be subjected to further treatments to produce a number of useful products.

The present invention accordingly provides a process for the preparation of a second composition, said process comprising the steps of:

preparing a first composition comprising an alkali metal magnesium orthosilicate and optionally either (i) magnesium oxide or (ii) an alkali metal silicate, by reaction, at a temperature from 500 to 1200° C., of an alkali metal carbonate compound, which compound is an alkali metal carbonate, an alkali metal bicarbonate or a mixture thereof, with a magnesium silicate, the molar ratio of alkali metal carbonate compound, expressed as alkali metal oxide of the formula $R_2O$, in which R represents an alkali metal, to magnesium silicate, expressed as silicon dioxide, of the formula $SiO_2$, being from 4:1 to 1:4, and contacting the first composition with water to produce the second composition comprising an amorphous magnesium silicate hydrate (M-S—H).

M-S—H represents an amorphous magnesium silicate hydrate of variable composition. It may be represented by an oxide formula in the form $pMgO.SiO_2.qH_2O$ where p is typically, from 0.5 to 2.0 and preferably from 0.6 to 1.5; and q is typically from 1 to 4.

The molar ratio of alkali metal carbonate compound, expressed as alkali metal oxide, to magnesium silicate, expressed as silicon dioxide, is preferably from <4:1 to 1:4, more preferably from 3:1 to 1:3, for example 2:1 to 1:2. The ratio is most preferably about 1.

The alkali metal is preferably potassium or, more preferably, sodium.

The alkali metal carbonate compound is preferably an alkali metal carbonate. It will be understood that when the alkali metal carbonate compound comprises bicarbonate the latter will generally decompose to the corresponding carbonate at the temperatures used in the process of the invention.

The alkali metal carbonate compound may be anhydrous or hydrated. Hydrates of sodium carbonate include the monohydrate and decahydrate. Hydrates of potassium carbonate include the sesquihydrate (also known as hemihydrate). It is preferable, when economically feasible, to use anhydrous alkali metal carbonate compounds to avoid the expenditure of energy required to remove water of hydration.

The magnesium silicate used in the process of the invention is generally a mineral silicate, for example a magnesium silicate rock comprising a magnesium silicate of general composition:

$$m(MgO).t(QO).SiO_2.xH_2O$$

wherein m is from 0.5 to 3, t is less than or equal to 1, x is from zero to 2; and Q represents a metal or metals other than magnesium, (for example calcium and/or a transition group metal such as iron, chromium or nickel). Preferably, the magnesium silicate rock comprises 20% or more, more preferably 50% or more of the magnesium silicate of the general composition described hereinbefore. Preferably, when Q represents iron, nickel and/or chromium, the process according to the present invention comprises isolation of an iron, nickel and/or chromium compound It will be understood that the composition or formulae of minerals is often depicted in terms of the theoretical amount of oxides which they contain: the oxides are, however, not present as such in the minerals whose composition is depicted in this way.

Such minerals include olivines, e.g. forsterite and monticellite; serpentines, e.g. antigorite, chrysotile, lizardite, sepiolite and garnierite; pyroxenes, e.g. enstatite, diopside, bronzite and hypersthene; amphiboles, e.g. amosite, anthophyllite, tremolite and actinolite; humites, e.g. chondrodite and norbergite; and other minerals such as chlorite, talc, iddingsite and hectorite. These minerals may contain substantial quantities of iron in addition to magnesium and silicon, and also significant amounts of calcium, aluminium and alkali metals, Asbestos comprises a group of naturally occurring minerals which includes fibrous serpentine (e.g. chrysotile) and amphibole (e.g. amosite, anthophyllite, tremolite and actinolite) minerals. The fibrillar forms of asbestos are known to be harmful to health and are considered to be human carcinogens. The process of the invention provides a means of converting these minerals into useful (and non-carcinogenic) materials.

The mineral silicate used in the process of the invention is preferably a magnesium silicate. The $MgO/SiO_2$ molar ratio is preferably from 0.5 to 3, more preferably 0.65 to 2. The $CaO/SiO_2$ molar ratio is preferably ≤0.5. The $FeO/SiO_2$ molar ratio is preferably ≤0.5. The content of other elements in terms of the (total oxides)/$SiO_2$ molar ratio is preferably ≤0.2.

The alkali metal carbonate compound used in the process of the invention may be a mineral, for example trona (tri-sodium hydrogen dicarbonate dihydrate; $Na_3H(CO_3)_2.2H_2O$), or a commercially available compound. It may contain impurities, for example hydroxides and silicates and, generally in smaller amounts, other impurities, e.g. chlorides, sulfates, sulphites, nitrates and nitrites. If impurities (e.g. alkali metal nitrates or hydroxides) are present which, at the temperature used in the process of the invention, decompose to an alkali metal oxide, they should be taken into account when calculating the amount of alkali metal oxide.

The process of the invention is preferably effected at a temperature from 600 to 1100° C., more preferably from 800 to 1000° C. Heating is generally effected for a few minutes to a few hours.

The process is preferably effected at a temperature at which the magnesium silicate is solid and the alkali metal carbonate corresponding to the alkali metal carbonate compound is solid or liquid.

According to a feature of the invention the process is effected at a temperature below the melting point of the alkali metal carbonate corresponding to the alkali metal carbonate compound.

We have found, unexpectedly, that it is possible to obtain a high degree of reaction between an alkali metal carbonate compound, preferably an alkali metal carbonate, and a magnesium silicate when the two materials are contacted with each other in the solid state. They are preferably in particulate form, for example as powders. A mixture of the compounds is preferably heated, for example in a furnace, to a temperature close to, but below, the melting point of the alkali metal carbonate corresponding to the alkali metal compound. The ratio of the carbonate and silicate used is preferably substantially equal to the stoichiometric ratio calculated on the basis that one mole of alkali metal oxide (written generically as "$R_2O$" in which R is as hereinbefore defined present in the alkali metal carbonate compound, is equivalent to one mole of silica ($SiO_2$) present in the magnesium silicate. For example, the stoichiometric mass ratio for the reaction between pure forsterite ($Mg_2SiO_4$, mol. wt.=140) and pure anhydrous sodium carbonate ($Na_2CO_3$, mol. wt.=106) would be 140:106. It will be understood that the actual silicate and carbonate sources used in practice will not always be pure, but the idealized stoichiometric ratio refers to that in which the heated mixture has an overall molar ratio of $R_2O:SiO_2$ substantially equal to unity.

The magnesium silicate and alkali metal carbonate compound used in the process of the present invention are preferably in particulate form or in shaped form, e.g. as pellets.

Rock used to provide the magnesium silicate and/or alkali metal carbonate compound for the process of the invention will generally be dried, crushed and, if necessary, ground (for example co-ground) to a desired particle size distribution. For example the magnesium silicate may be crushed to the granulometry of a fine sand (grain size 0.06 to 0.2 mm) or, if necessary, ground to a fine powder (grain sizes below 0.06 mm). Grain sizes greater than 0.06 mm are generally determined by sieving. Grain sizes lower than 0.06 mm are generally determined by laser granulometry. Undesirable mineral impurities can be separated to the extent consistent with energy efficiency by mechanical or other separation methods.

In one embodiment the process of the invention is conducted in a moving grate furnace. This procedure is especially suited to magnesium silicate rocks (rocks comprising mainly MgO and $SiO_2$) in which the $MgO/SiO_2$ molar ratio is close to or greater than 1.

A mixture of alkali metal carbonate compound and magnesium silicate, each in particulate form, is formed into pellets (e.g. using a disc or drum pelletizer). Water may be added to the mixture to facilitate the pelletising process. The pellets are fed onto a moving grate comprising, for example, a high-temperature-resisting steel alloy, where they are heated, for example, by the passage of hot gases, for example fuel combustion gases. The hot gases may be drawn through the bed of pellets on the grate by fans, usually placed under the grate. The process is illustrated diagrammatically in FIG. 1 of the accompanying drawings.

Typically, the hot gases are produced by burning, in an excess of air, a fossil fuel, such as natural gas, oil or coal; waste- or biomass-derived fuels, such as wood chips or waste fermentation gases, may also be used. Preferably the fuel used should have a low sulfur content, for example, <1%. The passage of hot gases through the bed heats the particles up, ultimately, to the desired temperature.

The rate of heating is controlled, for example, by varying the amount of fuel, the speed of the moving grate and/or the speed of the ventilation fans in order to ensure good overall energy efficiency and also to ensure that the pellets retain their mechanical integrity during the process. The moving grate is designed so that the gases may be passed through the bed several times along the length of the grate to allow for efficient heat transfer between the gases and the pellets, so that the gases leaving the furnace are as cool as possible. Moreover, once the pellets pass through the hottest zone ("burning zone") just after the combustion of the fuel, they are cooled by passing air through the bed, such that they reach as low a temperature as possible before being discharged from the bed. The incoming air, thus preheated by the outgoing solid particles, is used as the main air supply for combustion of fuel in the burning zone, thus leading to a high overall thermal efficiency for this type of furnace. The theoretical overall chemical reaction occurring during the heating process is shown below in equation (1a) for the reaction between forsterite ($Mg_2SiO_4$) and an alkali metal carbonate ($R_2CO_3$):

$$Mg_2SiO_4 + R_2CO_3 \Rightarrow MgO + R_2MgSiO_4 + CO_2 \uparrow \quad (1a)$$

in which R is as hereinbefore defined. The more general form of this reaction can be written as in equation (1b) for m>=1 and equation 1(c) for m<1:

$$m(MgO).t(QO).SiO_2.xH_2O + R_2CO_3 \Rightarrow (m-1)MgO + R_2MgSiO_4 + tQO + CO_2\uparrow + xH_2O\uparrow \quad (1b)$$

$$m(MgO).t(QO).SiO_2.xH_2O + R_2CO_3 \Rightarrow (1-m)R_2SiO_3 + mR_2MgSiO_4 + tQO + CO_2\uparrow + xH_2O\uparrow \quad (1c)$$

wherein m is greater than or equal to 1 for reaction (1b) and less than or equal to 1 for reaction (1c); and Q, t and x are as hereinbefore defined. The vertical arrows ↑ indicate that the carbon dioxide gas and water vapour produced by this reaction escape from the bed and exits with the rest of the exhaust gases. Thus, ideally, the final solid product remaining in the treated pellets is an intimate mixture comprising an alkali metal magnesium orthosilicate ($R_2MgSiO_4$) and optionally either magnesium oxide (MgO, also known as periclase) or an alkali metal silicate ($R_2SiO_3$), as well as other solid products comprising the other metals (Q), especially iron, which may present as magnetite ($Fe_3O_4$) or possibly as an alkali metal ferrite ($RFeO_2$), calcium, which may be present as silicates, chromium, which may be present as alkali metal chromates ($R_2CrO_4$), and nickel, which may be present as oxides.

The idealized reactions depicted in equations (1a,b,c) illustrate the production of alkali metal magnesium orthosilicates plus magnesium and/or other oxides and silicates by direct reaction of a stoichiometric (i.e. 1:1$R_2O:SiO_2$) mixture of a magnesium silicate and an alkali metal carbonate.

This type of reaction is very endothermic, mainly due to the liberation of carbon dioxide gas: it consumes about 3.4 kJ (i.e. about 0.8 kcal) of heat per gram of $CO_2$ liberated. Thus, regardless of the temperature at which the reaction is conducted, there will be a significant net energy consumption for the overall process. However, if the reaction is conducted, as described above, in a furnace system which allows for good counter-current heat exchange between the outgoing hot gases and the incoming solids, and likewise between the outgoing hot solids and the incoming combustion air, the net energy consumption can be reduced to a value close to the theoretical limit given above. It is important, for energy efficiency, to have efficient counter-current heat exchange at both the beginning and the end of the process, incoming and outgoing, for example in a moving grate furnace as described above.

In a further embodiment, the process of the invention is conducted in a system comprising moving grates for preheating and cooling and a rotary kiln for the process of the invention which comprises a decarbonation step which produces carbon dioxide.

When a moving grate system is used it is important to maintain the solid in the form of suitably-sized pellets so that they form a porous bed on the grate, allowing for the passage of gases. The pellets preferably retain their mechanical integrity; they preferably also maintain their mean size within pre-determined limits.

According to a feature of the invention, in order to facilitate maintenance of the mechanical integrity of the pellets either (a) the maximum solids temperature in the process does not substantially exceed the melting point of the alkali metal carbonate corresponding to the alkali metal carbonate compound, and/or (b) the maximum solid volume fraction of melt-forming material (substantially alkali metal carbonate) in the pellets is generally below the value at which the nodule will deform significantly even if the alkali metal carbonate melts. This value is generally below about 35% of the total solids volume. However, since the reaction itself produces no liquid products (only solids and gases) at the temperatures preferably employed, the risk of the nodules deforming significantly due to melting is quite low even at far higher initial volume fractions of alkali metal carbonate as long as the heating occurs slowly enough to allow for a significant degree of reaction to occur before complete melting of the alkali metal carbonate.

According to a further feature of the invention the process of the invention is conducted in a suspension preheater system comprising a plurality of cyclones in a preheater and, for example, a rotary kiln, for example as used in a typical modern cement plant. The starting materials, for example as a mixed substantially dry powder, are fed (cold) into the top cyclone of the preheater. During its passage through the preheater cyclone tower, by counter-current heat exchange with kiln exit gases, the material is heated close to the melting point of the alkali metal carbonate corresponding to the alkali metal carbonate compound, but without reaching this melting point, in order to avoid, for example, the formation of accretions on the walls of the preheater. At the bottom of the preheater tower, the mixed powder enters a rotary kiln in which, as the temperature rises to the melting point of the alkali metal carbonate, the powder self-nodulizes. The ratio of alkali metal carbonate compound to magnesium silicate and/or the particle size distribution of the magnesium silicate and alkali metal carbonate compound in particulate form is chosen to promote self-nodulization. The nodules are then decarbonated in the rotary kiln. The decarbonated nodules are then cooled, for example on a moving grate cooler also as used in typical modern cement plants. The heat of the hot nodules can be used to preheat the incoming combustion air for the kiln by counter-current heat exchange.

The decarbonated and cooled pellets or nodules, comprising an alkali metal magnesium orthosilicate and optionally either magnesium oxide or an alkali metal silicate, are treated in order to separate the reaction products.

In the process of the invention the first composition, comprising an alkali metal magnesium orthosilicate and optionally either magnesium oxide or alkali metal silicate products is contacted with water to form a second composition comprising solid amorphous magnesium silicate hydrates (and optionally solid magnesium oxide or hydroxide), together with an aqueous solution comprising alkali metal cations, hydroxide anions and silicate anions.

The first composition as, for example pellets or nodules, is preferably quenched in an amount of water, such that the final mixture after quenching has a temperature close to, but not exceeding, about 100° C., i.e. enough to quench the solids but avoiding excessive evaporation of water. The hot quenched solids are then preferably crushed and agitated mechanically in the form of a slurry. More water may be added if necessary. Some additional heating may be necessary.

Alternatively the treatment with water, for example in the quenching and slurry-formation process described above, can be conducted at a temperature above 100° C. if a pressurized vessel (e.g. an autoclave) is used.

Alternatively the above quenching and slurry-formation process can be conducted at lower or ambient temperatures.

Water for converting the first composition into the second composition can optionally be recycled from another part of the process.

The objective is to separate the components of the second composition by virtue of the facts that (a) alkali metal carbonates, silicates, chromates, sulfates and oxides or hydroxides in the product will tend to dissolve readily in water; (b) alkali metal magnesium orthosilicates will tend to hydrate in hot water to release alkali metals into solution as silicates and hydroxides, the remainder giving a fine suspension of solid amorphous magnesium silicate hydrates, and (c) magnesium oxide (MgO, also known as periclase) in the sample will tend to hydrate in hot water to give magnesium hydroxide (Mg(OH)$_2$, also known as brucite) to form a soft and easily-dispersible powder.

The slurry may need to be agitated mechanically. Then, the liquid phase can be separated from the bulk of the unreacted alkali metal magnesium orthosilicate and other unreacted anhydrous compounds, for example by sieving, and the fine particles of magnesium hydroxide and/or amorphous magnesium silicate hydrates which pass through the sieve as a slurry may be separated from the slurry by, for example, filtering, passage through a hydrocyclone, settling and/or centrifuging. The aqueous phase after separation of the magnesium hydroxide comprises an aqueous solution of alkali metal silicates and hydroxides.

Alternatively, the separation process may be conducted in two steps, the first step comprising a rapid washing process to remove most of the readily soluble alkali metal carbonates, silicates and hydroxides; and the second step, conducted with additional water, comprising further hydration of both the magnesium oxide and the alkali metal magnesium orthosilicate. In this two-step approach, the water temperature is preferably lower for the first step (for example lower than 60° C.) than for the second step, and an autoclave may be used for the second step if necessary.

The overall result of the separation process described above can be summarized as follows:

Solid products from the process of the invention, e.g. from the furnace or kiln, (for example, a mixture of larger particles of unreacted raw materials with R$_2$MgSiO$_4$, MgO or R$_2$SiO$_3$, QO, and possibly some residual R$_2$CO$_3$) are contacted with water to produce a second composition comprising:

(a) a fine suspension comprising amorphous magnesium silicate hydrates and optionally Mg(OH)$_2$ in a highly alkaline solution rich in alkali metal silicates, hydroxides and possibly also carbonates, and (b) coarse unreacted solids comprising R$_2$MgSiO$_4$, and optionally MgO, QO and unreacted particles of the original magnesium silicate rock (e.g. Mg$_2$SiO$_4$), and which separate easily by sedimentation (e.g. in a hydrocyclone) from the fine suspension.

The fine suspension can then be further separated (e.g. by filtration) to give (c) fine solids rich in amorphous magnesium silicate hydrates and optionally Mg(OH)$_2$, and (d) a solution rich in alkali metal silicates, hydroxides and possibly also carbonates, and also comprising minor amounts of alkali-soluble impurities, e.g. sulfates and chromates.

The initial part of the reaction of the solid products in the process of the invention with water can be written qualitatively as follows, for m≥1 (equation 2a), and m≤1 (equation 2b):

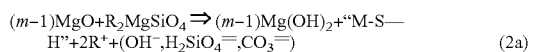

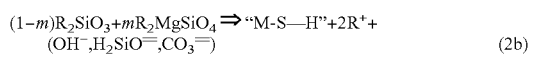

In the above reactions, the main solid compounds produced are an amorphous magnesium silicate hydrate, "M-S—H", of variable composition, plus, in the case where m>1, magnesium hydroxide (brucite). The alkali metals may dissolve completely in the aqueous phase as alkali metal cations (R$^+$), and the charge of these alkali metal cations is balanced by a mixture of dissolved anions, e.g.: hydroxide (OH$^-$), silicate (H$_2$SiO$_4$$^=$) and possibly also carbonate (CO$_3$$^=$), present in various ratios depending on the conditions and materials used. It is to be understood that equations 2(a) and 2(b) are not perfectly balanced equations but rather are simply intended to indicate the main initial products of the reaction between the solid products of the process of the invention with water.

In a further embodiment of the invention the alkaline solution produced in step (d) is contacted with a carbon dioxide-containing gas, for example combustion exhaust gases, to absorb carbon dioxide and yield an alkali metal carbonate, alkali metal bicarbonate or a mixture thereof, generally in solution, and (precipitated) silica.

For example, the aqueous solution from step (d) comprising mainly alkali metal hydroxides and silicates and also some residual alkali metal carbonates is contacted with a carbon dioxide-containing gas, for example CO$_2$-rich combustion exhaust gases, such as the gases leaving the kiln used to heat-treat the pellets or nodules and those leaving the preheater. The solution rapidly absorbs CO$_2$ from such gases to produce a solution of alkali metal carbonates and bicarbonates, and a precipitate of amorphous silica, according to the following, or similar, equations:

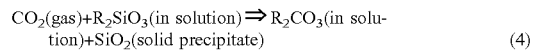

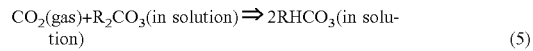

The resulting solid silica precipitate is separated from the solution, for example by filtering, passage through a hydrocyclone, settling and/or centrifuging. In order to avoid an excessively fine amorphous silica precipitate which may cause the solution to gel completely or be too difficult to filter or separate, the concentration, the temperature of the solution during neutralization, and/or the rate of neutralization are controlled. Additional solutes, e.g. known salts, may also be incorporated into the solution. The precipitated silica formed by reaction (4) above can be separated, washed and dried for use in various applications.

It will be understood by mass balance that reactions (3) and (4) should in principle be able to absorb essentially all of the CO$_2$ released by the chemical reaction occurring in the process of the invention as shown in reaction (1), but that the additional CO$_2$ resulting from the combustion process required to heat the starting materials will require an additional reaction to absorb it completely, e.g. either a reaction such as (5), or a further reaction with another absorbent.

The present invention thus provides a process as described hereinbefore which further comprises isolating or producing magnesium oxide, magnesium hydroxide or an alkali metal silicate from the second composition.

In a further embodiment of the invention, the second composition comprising M-S—H is carbonated, i.e. contacted with a carbon dioxide-containing gas, preferably in the presence of water, to produce a third composition comprising a magnesium carbonate compound. The rate of this reaction can be controlled by the temperature, the pressure, the relative humidity, the presence of catalysts and/or the type of reactor used. The carbonation reaction may be represented for example by the equation:

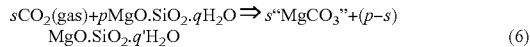
$$sCO_2(gas) + pMgO.SiO_2.qH_2O \Rightarrow s\text{"}MgCO_3\text{"} + (p-s) MgO.SiO_2.q'H_2O \qquad (6)$$

The first product of this carbonation reaction, shown above as "$MgCO_3$" may be either a simple magnesium carbonate, such as magnesite ($MgCO_3$) or nesquehonite ($MgCO_3.3H_2O$), or a complex magnesium hydroxy-carbonate hydrate such as hydromagnesite ($Mg(OH)_2.4MgCO_3.4H_2O$), or artinite ($Mg(OH)_2.MgCO_3.3H_2O$), depending on the conditions employed. The second product of this reaction, shown above as "$(p-s) MgO.SiO_2.q'H_2O$" represents either an amorphous magnesium silicate hydrate with a lower magnesium/silicon ratio (p−s) than that (p) of the starting magnesium silicate hydrate; or, in the case where p=s, it represents simply a (hydrated) amorphous silica.

In a further embodiment of the invention the coarse, partially reacted solids separated from the reaction products in step 1(b) above comprise mainly unreacted magnesium silicate (for example, $Mg_2SiO_4$) mixed with some intermediate products (for example, $Na_2MgSiO_4$). These can be dried and recycled to be mixed with additional raw magnesium silicate starting material for feeding back into the process. It will be understood that drying should be accomplished in an energy-efficient manner, e.g. first by drainage and then by use of waste heat from the furnace or other sources.

According to a further feature of the invention all of the solid products from the process of the invention, e.g. from the furnace or kiln (for example, a mixture of larger particles of unreacted raw materials with $R_2MgSiO_4$ and MgO or $R_2SiO_3$ and/or QO, and possibly some residual $R_2CO_3$) are ground together with water to produce a suspension or slurry which is then contacted with a gas containing carbon dioxide, for example $CO_2$-rich combustion exhaust gases, such as the gases leaving the kiln used to heat-treat the pellets or nodules and those leaving the preheater. During this treatment, in addition to the other reactions described above, (e.g. in equations (2), (3), (4), (5) and (6)), the alkali metal magnesium orthosilicate compound can also react directly with $CO_2$ as indicated by equations (7) and (8) below:

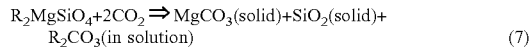
$$R_2MgSiO_4 + 2CO_2 \Rightarrow MgCO_3(\text{solid}) + SiO_2(\text{solid}) + R_2CO_3(\text{in solution}) \qquad (7)$$

or, alternatively, making use of an alkali bicarbonate solution to achieve the same reaction:

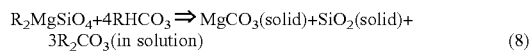
$$R_2MgSiO_4 + 4RHCO_3 \Rightarrow MgCO_3(\text{solid}) + SiO_2(\text{solid}) + 3R_2CO_3(\text{in solution}) \qquad (8)$$

The alkali metal bicarbonate $RHCO_3$ used in reaction (8) may be formed by the reaction of alkali metal carbonate solution $R_2CO_3$ produced in reaction (7) with carbon dioxide, as shown in equation (5).

Reactions of the type indicated by equations (7) and (8) may be conducted at ambient temperatures and pressures, or at elevated temperatures and pressures up to as high as 300 atmospheres and 300° C. Additional solid products, such as complex alkali metal magnesium carbonates, (e.g. eitelite, $Na_2CO_3.MgCO_3$), may form and can be separated, either for re-use within the process or as useful products in their own right.

These types of reaction are capable of capturing a large amount of carbon dioxide and converting it into substantially stable solid products. The magnesium carbonate solid produced can be either simple magnesium carbonates, such as magnesite ($MgCO_3$) or nesquehonite ($MgCO_3.3H_2O$), or a complex magnesium hydroxy-carbonate hydrate, such as hydromagnesite ($Mg(OH)_2.4MgCO_3.4H_2O$), or artinite ($Mg(OH)_2.MgCO_3.3H_2O$), depending on the conditions and starting materials. The silica solid produced can be either a simple amorphous silica or a more complex mixed metal hydroxy-silicate such as an amorphous magnesium silicate hydrate ("M-S—H"). The alkali metal carbonate or bicarbonate solutions resulting from complete carbonation as shown in reactions (3), (4), (5), (7) and (8) can be concentrated, e.g. by evaporation, allowing the solids to be crystallized and then recycled to the start of the process. The solid mixture of magnesium carbonates and silica produced by these reactions is one of the final products of the overall process and, after washing if necessary to recover as much as possible of the soluble alkali metal salts, can be separated for disposal or for use in other processes.

The overall object of the process is to convert magnesium silicate rock into useful industrial products with low overall $CO_2$ emissions. A further benefit of the process is to capture gaseous $CO_2$ (e.g. from industrial flue gases) and convert it into a substantially stable mineral carbonate which comprises a magnesium carbonate compound. Below are some examples of some different ways in which the process can be used:

Starting with a magnesium silicate rock of composition $m(MgO).t(QO).SiO_2.xH_2O$, and recycling substantially all of the alkali metal (R) compounds used back into the process, at least two separate major product streams can be secured from amongst the following:

(i) Products rich in magnesium oxide or hydroxide (MgO or $Mg(OH)_2$)
(ii) Products rich in amorphous silica ($SiO_2$)
(iii) Products rich in amorphous magnesium silicate hydrates (M-S—H)
(iv) Products rich in magnesium carbonate compounds, e.g. either simple magnesium carbonates, such as anhydrous magnesium carbonate itself ($MgCO_3$, also known as magnesite); or magnesium carbonate trihydrate ($MgCO_3.3H_2O$, also known as nesquehonite); or magnesium hydroxy-carbonate hydrate, such as ($Mg(OH)_2.4MgCO_3.4H_2O$, also known as hydromagnesite, or ($Mg(OH)_2.MgCO_3.3H_2O$), also known as artinite.

Improved separation of the above major solid product streams can also be achieved by the application of other known mineral separation techniques such as, for example, flotation. Such flotation techniques can be effected using flotation aids including sodium oleate, carboxymethylcellulose and methyl isobutyl carbinol.

To the extent that $CO_2$ is produced by the combustion of fuels used in the process, e.g. to heat the kiln or furnace, or to dry materials, this $CO_2$ can be captured in the process in the form of product (iv) listed above, by using a treatment process based on the reactions shown above. To the extent that the process is energy-efficient, the aforesaid $CO_2$ produced by the combustion of fuels used in the process, even if substantially completely captured by reactions of the sort shown, for example, in equations (3), (4) and (5), will generally not be sufficient to convert all of the magnesium in the process to product stream (iv), leaving some of the magnesium available for the production of product streams (i) and (iii). However, in another embodiment of the process, additional $CO_2$ can be obtained from other sources and included in the treatment process and thus captured. In such a case, it is possible to operate the process in such a way that product stream (i) is not produced, but the process itself becomes a net consumer of $CO_2$. Moreover, it is also possible to operate the process without separating any of the product streams, so that the only product stream produced is a mixture of some or all of the above product streams In a further approach, the process uses the same magnesium silicate raw material as shown above, but in this case, not all of the alkali metal-rich products of the process are recycled within the process. It is therefore possible to have one or more additional product streams as well as those already listed above. For example, one very useful product stream is an alkali metal silicate, ($R_2SiO_3$), either in the form of an alkaline aqueous solution also containing alkali metal hydroxides and/or carbonates, or as a solid product, (for example, obtained by evaporation and/or crystallization).

According to a feature of the invention the process further comprises carbonation of the second composition, e.g. by treatment with gases containing $CO_2$, to produce a third composition comprising a magnesium carbonate, e.g. either simple magnesium carbonates, such as anhydrous magnesium carbonate itself ($MgCO_3$), also known as magnesite; or magnesium carbonate trihydrate ($MgCO_3.3H_2O$), also known as nesquehonite; or magnesium hydroxy-carbonate hydrates, such as ($Mg(OH)_2.4MgCO_3.4H_2O$), also known as hydromagnesite, or ($Mg(OH)_2.MgCO_3.3H_2O$), also known as artinite.

According to a further feature of the invention, the process further comprises conducting the carbonation of the second composition as described in the preceding paragraph, but where the second composition is first formed by moulding or pressing to form a shaped article, such that the resulting final carbonated composition retains the form of the shaped article but is further hardened by the formation of magnesium carbonates in situ. The present invention thus provides a process as described hereinbefore, in which the carbonation of the second composition is conducted in a second step, after a first step during which the second composition is formed by moulding or pressing to form a shaped article, such that a carbonated shaped article is obtained.

The present invention further provides a carbonated shaped article obtained by the process as described hereinbefore.

According to a further feature of the invention the process further comprises calcining the magnesium carbonate from the third composition to produce a fourth composition comprising magnesium oxide.

The invention also provides a process in which a product comprising a transition metal such as iron, nickel and/or chromium compound is produced.

Another useful product stream is rich in transition metal oxides, for example iron oxides such as magnetite ($Fe_3O_4$), and which may also contain significant amounts of chromium and/or nickel oxides. These oxides can be concentrated by flotation and/or magnetic separation.

Another useful product stream is an alkaline solution containing chromates, which can be treated with a reducing agent and pH control (or by electrochemical reduction) to separate relatively pure chromium oxides, or even chromium metal; for example:

$R_2CrO_4$(aqueous solution)+(reducing agent) $\Rightarrow$ Cr(OH)$_3$(solid precipitate)

In this specification, including the accompanying claims, percentages unless otherwise indicated are by mass.

The term "pellets" as used in this specification including the accompanying claims is to be understood as embracing shaped, generally substantially spherical, forms such as pellets, nodules and granules.

Particle size distribution when measured by laser granulometry is measured using a Malvern MS2000 laser granulometer. Measurement is effected in ethanol. The light source consists of a red He—Ne laser (632 nm) and a blue diode (466 nm). The optical model is that of Mie and the calculation matrix is of the polydisperse type.

The apparatus is checked before each working session by means of a standard sample (Sifraco 010 silica) for which the particle size distribution is known.

Measurements are performed with the following parameters: pump speed 2300 rpm and stirrer speed 800 rpm. The sample is introduced in order to establish an obscuration between 10 and 20%. Measurement is effected after stabilisation of the obscuration. Ultrasound at 80% is first applied for 1 minute to ensure the de-agglomeration of the sample. After about 30 s (for possible air bubbles to clear), a measurement is carried out for 15 s (15000 analysed images). Without emptying the cell, measurement is repeated at least twice to verify the stability of the result and elimination of possible bubbles.

All values given in the description and the specified ranges correspond to average values obtained with ultrasound.

It is to be understood that in the foregoing text, unless otherwise specified, the symbols R, Q, m, t, x and, p are as initially defined.

The following non-limiting Examples illustrate embodiments of the invention.

The following abbreviations and notations are used:
XRF X-ray fluorescence
XRD X-ray diffraction
ICP Inductively-Coupled Plasma Photometry
Hydromagnesite $Mg(OH)_2.4MgCO_3.4H_2O$
Artinite $Mg(OH)_2.MgCO_3.3H_2O$
Eitelite $Na_2CO_3.Mg(CO_3)$
LOI Loss on ignition

EXAMPLE 1

Ground pure olivine sand $(Mg_{0.94}Fe_{0.06})_2SiO_4$ was mixed with sodium carbonate hydrate powder in a 14:11 mass ratio. The molar ratio of this mixture is close to 1:1. 25 g of this powder was pressed into a pellet and placed into a lab furnace in a platinum crucible. It was heated up to 800° C. over 2 hours, maintained at 800° C. for 1 hour and cooled back to room temperature by natural cooling. In order to evaluate the reaction efficiency, separate samples of the sodium carbonate and olivine used underwent exactly the same heat treatment. The measured ignition losses are shown in the following Table.

| Sample | Loss on Ignition |
|---|---|
| Sodium carbonate powder | 14.97% |
| Ground olivine sand | 0.22% |
| 14:11 mix of ground olivine sand + sodium carbonate powder | 16.69% |

The ignition loss of the pure sodium carbonate was due entirely to loss of hydrate water and not to decomposition or evaporation of the carbonate. The pure olivine sample remained essentially unchanged during heat treatment, but the mixed sample reacted. From the measured LOI data, it is estimated that 60% of the $CO_2$ from the carbonate was lost from the mixture. The phase constitution of the reacted sample was determined by XRD. The reaction products observed by this technique were $Na_2MgSiO_4$, MgO and $Fe_2O_3$ together with some unreacted olivine and sodium carbonate.

10 g of the reacted sample was put into 100 ml of de-ionised water under constant stirring at 40° C. for 1 h in order to evaluate its dissolution behaviour. The solution was filtered and the solid residue was analysed by XRD. The amounts of dissolved elements in the aqueous solutions were measured by ICP.

The main solid phases detected in the filtered solid residue were $Na_2MgSiO_4$, MgO, $Fe_2O_3$ and olivine. All non-reacted sodium carbonate dissolved in the aqueous solution. Additionally, some dissolved $SiO_2$ was detected with a concentration of 667 mg/l. From this value, one can estimate that 2 to 3% of the total silica from the mixture dissolved in the water under these conditions, (presumed to be as a sodium silicate, as the pH of the solution was measured to be about 12).

EXAMPLE 2

The same ground pure olivine sand $(Mg_{0.94}Fe_{0.06})_2SiO_4$ and sodium carbonate hydrate powder as used in Example 1 were mixed in a 1400:1235 mass ratio. The molar ratio of this mixture is approximately 1:1. The powder was pressed into pellets and placed (in a platinum crucible) into a lab furnace which was kept at 900° C. The sample was air-quenched after 1 h of heat treatment. Separate samples of the sodium carbonate and olivine used underwent an identical heat treatment. It is important to mention that at this temperature, sodium carbonate is in the liquid state. (The melting temperature of this compound is 851° C.). The measured loss on ignition of all of the samples is presented in the following Table.

| Sample | Loss on Ignition |
| --- | --- |
| Sodium carbonate | 14.96% |
| Olivine | 0.04% |
| Olivine + Sodium carbonate | 23.02% |

From the measured LOI data, a conversion rate (degree of decarbonation) close to 100% was obtained which means that the reaction was essentially complete. The reaction product was analysed by XRD and the phases detected were $Na_2MgSiO_4$, MgO, $NaFeO_2$ together with some un-reacted olivine. No remaining sodium carbonate was detected, in agreement with the observed loss on ignition data. The MgO to $Na_2MgSiO_4$ mass ratio was estimated by Rietveld analysis of the XRD data to be 14:86, in reasonable agreement with mass balance calculations.

EXAMPLE 3

Figure 2:
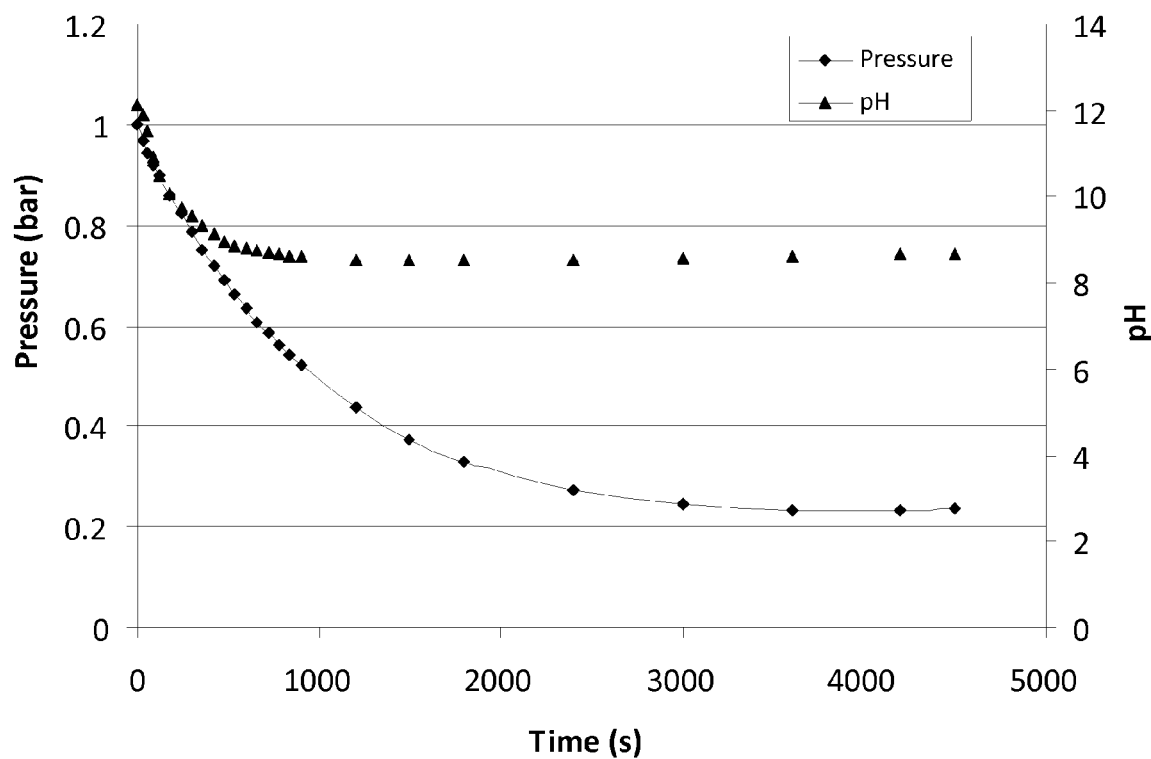

13 g of the powdered product of Example 2 was mixed with 260 ml of water to give a slurry with about 50 g/L solids concentration. This slurry was put in a closed pressure reactor with a total volume of 2 liters, maintained at 25° C. The reactor was first evacuated and then filled with pure gaseous $CO_2$ up to one atmosphere pressure. The pressure of the gas and the pH of the aqueous solution were recorded as functions of time and are presented in FIG. 2. The rate of pressure drop indicates that the slurry captures gaseous $CO_2$ rapidly, and, concurrently, the pH of the solution falls rapidly from an initial value of over 12 to a final value of about 8.5, consistent with the formation of a mixed sodium carbonate/bicarbonate solution. After this reaction the solids in the slurry were filtered and analysed by XRD. $NaFeO_2$ was no longer detectable and the $MgO:Na_2MgSiO_4$ ratio had increased to an estimated value of 18:82, indicating that some sodium silicate had leached out of the $Na_2MgSiO_4$ phase into the solution and had then been carbonated.

EXAMPLE 4

5 g of the powdered product of Example 2 was mixed with 200 ml of water to give a slurry of about 25 g/L solids concentration. This slurry was then boiled gently for one hour, after which it was filtered and the solid residue analyzed by XRD. The relative concentration of the $Na_2MgSiO_4$ phase in the residue was clearly greatly reduced compared to the original untreated residue, and the relative concentration of MgO greatly increased. The $NaFeO_2$ phase had also completely disappeared but peaks for a layered double hydroxide phase probably having a formula close to $4MgO.Fe_2O_3.CO_2.10H_2O$ were seen clearly, together with weaker peaks for $Fe_2O_3$ (haematite) and unreacted olivine.

The liquid filtrate was also analyzed by ICP and the results (see the Table below) showed a high concentration (6.92 g/L as $Na_2O$) of sodium in solution, as well as 0.47 g/L of $SiO_2$. This confirms that most of the sodium had leached out of the sample, and that about 15% of it was probably in the form of a sodium metasilicate solution, the rest presumed to be a mixture of sodium hydroxide and sodium carbonate.

| Chemical analysis of the aqueous solution | |
| --- | --- |
| Chemical species | Concentration [mg/l] |
| $SiO_2$ | 466 |
| $Al_2O_3$ | 6.65 |
| $Fe_2O_3$ | 1.78 |
| CaO | 0.51 |
| MgO | 1.51 |
| $K_2O$ | 2.40 |
| $Na_2O$ | 6920 |
| $SO_3$ | 2.53 |
| P | 0.58 |

EXAMPLE 5

The powdered product of Example 2 was mixed with water to give slurries (suspensions) with various solids concentrations, in some cases with the addition of various soluble salts to the initial aqueous solution. A sample of slurry was put in a closed reactor with a total volume of 1.65 liters, maintained at 35° C. and agitated with a mechanical stirrer operating at 500 rpm. The reactor was first evacuated and then filled with pure gaseous $CO_2$ up to one atmosphere pressure. The pressure of the gas, which decreased with time due to its absorption by the slurry, was recorded continuously. Whenever the pressure reached a relatively constant value, further $CO_2$ was added again to bring it back to one atmosphere. By following the change of pressure with time between refills, it was possible to estimate the total amount of $CO_2$ consumed by reaction with the slurry. Results for a series of such experiments are summarized in the following Table.

| Experiment n° | Total CO2 captured (mol) | Slurry volume (mL) | Slurry conc. (g/L) | Total solids. (g) | CO2 captured, as % of theoretical maximum | Slurry additives | Temp. (° C.) | Duration (h) | Solid products detected |
|---|---|---|---|---|---|---|---|---|---|
| 1 | 0.0641 | 260 | 50 | 13.0 | 35 | Na2CO3: 21.15 g/L | 35 | 24 | Hydromagnesite |
| 2 | 0.0724 | 260 | 50 | 13.0 | 40 | Na2CO3: 53.85 g/L | 35 | 24 | Hydromagnesite |
| 3 | 0.1363 | 260 | 50 | 13.0 | 75 | NaHCO3: 53.85 g/L | 35 | 30 | Hydromagnesite |
| 4 | 0.0352 | 260 | 11.5 | 2.99 | 84 |  | 35 | 26 | Artinite |

The theoretical maximum $CO_2$ capture was calculated on the assumption that all of the carbonatable solids, expressed in terms of MgO and $Na_2O$ in the solids, would carbonate to give $MgCO_3$ and $Na_2CO_3$, respectively, irrespective of any slurry additives present. However, it was observed that the main solid products were usually hydromagnesite and, in one case, artinite, which would imply a slightly lower amount of $CO_2$ capture than the maximum theoretical value. In experiment 4, during which no slurry additives were used (i.e. pure water was used to make the slurry) the amount of $CO_2$ captured, at 84% of theoretical, is actually slightly more than would be expected if artinite were the main magnesium carbonate formed, so it is likely that other carbonates were also formed but not detected. In any case, the result of experiment 4 shows that it is possible to essentially fully carbonate an aqueous suspension of the reaction product of Example 2 in about one day at atmospheric pressure. (Note also that the duration of these experiments was probably longer than necessary because they had to be left overnight unattended, during which time no additional $CO_2$ could be added to bring the pressure back up. If one atmosphere pressure of $CO_2$ had been maintained continuously, the reaction times would probably have been significantly shorter).

EXAMPLE 6

A crushed sample of serpentine from Horsmanaho, Finland (ground in a ball mill to a powder with 43% passing a 75 micrometer sieve, and containing, by mass, 37.9% silicon expressed as $SiO_2$, 38.7% magnesium expressed as MgO, 7.4% iron expressed as $Fe_2O_3$, and with an ignition loss of 14.9% at 950° C.), was mixed with anhydrous sodium carbonate powder in a 5355:4645 mass ratio (molar ratio approximately 1:1.3). About 5 kg of the mixed powder was pressed into a steel crucible and calcined in a lab furnace at 950° C. for 4.5 hours. The mass loss during calcination was 27.9%. From the measured mass loss it can be estimated that the decarbonation reaction was complete. The reaction product was analysed by XRF spectrometry and shown to contain 27.8% silicon expressed as $SiO_2$, 30.4% magnesium expressed as MgO, 5.7% iron expressed as $Fe_2O_3$, and 33.4% sodium expressed as $Na_2O$. An XRD analysis showed the major phases present in the product to be $Na_2MgSiO_4$ and periclase (MgO).

EXAMPLE 7

The reaction products of Example 2 (referred to hereinafter as "product X") and of Example 6 (referred to hereinafter as "product XS") were ground to powders, and the finenesses of the resulting powders were measured using the Blaine Specific Surface Area (BSS) method. For each sample of product X or XS, 75 g of the solid were added to 1.5 liters of deionized water in a glass reactor equipped with a stirrer with a helicoidal Teflon® paddle operating at 500 rpm. Pure $CO_2$ gas was bubbled continuously through the agitated suspension (via a porous glass frit at the bottom) at a flow rate of 12 normal liters per hour at close to one atmosphere absolute pressure. The reactor contents were maintained at 70° C. by a jacket heated by circulating hot water. After various periods of time, samples of the suspension were taken to assess the progress of the carbonation reaction. The samples were filtered and the liquid filtrates were analysed for dissolved elements by ICP. The solid filter-cakes were dried at 110° C. and then analysed by XRF spectrometry for elemental composition, by XRD for qualitative phase composition, and by thermal analysis coupled with evolved gas analysis for the quantitative detection of combined $CO_2$ and water. In order to calculate the amount of magnesium that had reacted, it was assumed that all of the $CO_2$ in the dried filter-cake was present in the form of hydromagnesite.

The results for three different product samples are given in the following Table

| Experiment N°; anhydrous product used | Duration (h) | Blaine specific surface area of anhydrous product, $m^2/kg$ | Main crystalline phases detected in dried filter-cake | Total Mg content of dried filter-cake, expressed as MgO, % | $CO_2$ content of dried filter-cake, % | Estimated Mg in hydromagnesite expressed as % MgO in filter-cake | Mg in aqueous phase expressed as % MgO relative to filter-cake | Estimated degree of reaction of MgO in anhydrous product, % |
|---|---|---|---|---|---|---|---|---|
| 5 Product X | 3.5 | 420 | Hydromagnesite | 31.2 | 15.9 | 18.2 | 0.6 | 59 |
| 6[1] Product X | 4.0 | 600 | Hydromagnesite | 30.3 | 16.4 | 18.8 | 0.5 | 63 |

-continued

| Experiment N°; anhydrous product used | Duration (h) | Blaine specific surface area of anhydrous product, m²/kg | Main crystalline phases detected in dried filter-cake | Total Mg content of dried filter-cake, expressed as MgO, % | CO2 content of dried filter-cake, % | Estimated Mg in hydro-magnesite expressed as % MgO in filter-cake | Mg in aqueous phase expressed as % MgO relative to filter-cake | Estimated degree of reaction of MgO in anhydrous product, % |
|---|---|---|---|---|---|---|---|---|
| 7 Product XS | 4.0 | 205 | Hydro-magnesite | 27.7 | 17.2 | 19.7 | 0.4 | 71 |

[1] In experiment 6, a high-power agitation system was used instead of the normal stirrer It can be seen from the above results that it is possible to carbonate products X and XS at only one atmosphere pressure in aqueous suspension and obtain conversion yields of the order of 60-70% of the total magnesium in the starting material in about 3.5 to 4 hours. Based on XRF analyses of the solid phases coupled with ICP analyses of the liquid phase, it is estimated that roughly 90% of the initial Na and 50% of the initial Cr in the product leached out during the experiment.

EXAMPLE 8

Formation of Eitelite

The procedure of Example 7 was repeated using two slurries (prepared from products X and XS from Examples 2 and 6, respectively) at a concentration of 150 g/L, i.e. three times the concentration used in Example 7.

During the 3 first hours the same trends were observed as those in Example 7. But after 4 hours, XRD revealed the presence of eitelite as well as hydromagnesite. The results are given in the following Table.

| Experiment N°; anhydrous product used | Duration (h) | Blaine specific surface area of anhydrous product, m²/kg | Main crystalline phases detected in dried filter-cake | Total Mg content of dried filter-cake, expressed as MgO, % | CO2 content of dried filter-cake, % | Estimated Mg in hydro-magnesite expressed as % MgO in filter-cake | Mg in aqueous phase expressed as % MgO relative to filter-cake | Estimated degree of reaction of MgO in anhydrous product, % |
|---|---|---|---|---|---|---|---|---|
| 8 Product X | 4.0 | 600 | Hydro-magnesite & eitelite | 28.06 | 16.45 | 18.83 | 0.5 | 67.12 |
| 9 Product XS | 4.0 | 600 | Hydro-magnesite & eitelite | 25.74 | 15.82 | 18.11 | 0.8 | 70.37 |

EXAMPLE 9

Effectiveness of Water Leaching 50 g of product X was washed in 1 L deionised water 6 times in series (15 minutes stirring in between at room temperature and atmospheric pressure, i.e. 25° C. and 1 bar). Each time a small sample was taken to analyse the solids and the liquids. The XRF results for product X coupled with ICP solution analyses lead to the results given in the following Table, which the percentages of each element leached from the product are given as a function of the number of washing steps.

| % leached | Si | Ca | Mg | K | Na | S | Cr |
|---|---|---|---|---|---|---|---|
| Washing 1 | 9.85 | 0.46 | 0.00 | 19.76 | 36.44 | 13.77 | 46.12 |
| Washing 2 | 3.20 | 0.09 | 0.00 | 1.94 | 8.69 | 0.60 | 1.30 |
| Washing 3 | 1.41 | 0.02 | 0.00 | 0.25 | 3.47 | 0.04 | 0.21 |
| Washing 4 | 1.22 | 0.02 | 0.00 | 0.03 | 3.53 | 0.13 | 0.32 |
| Washing 5 | 0.75 | 0.02 | 0.00 | 0.02 | 1.87 | 0.14 | 0.12 |
| Washing 6 | 0.51 | 0.05 | 0.00 | 0.00 | 1.30 | 0.05 | 0.08 |
| TOTAL | 16.94 | 0.66 | 0.01 | 22.00 | 55.31 | 14.73 | 48.15 |

The first washing step was clearly the most efficient. Therefore 500 g of product X were washed in the same conditions, the solid was then filtered and dried overnight at 110° C. Finally the same carbonation experiment as described in Example 8 was performed on this solid product. This time XRD analysis revealed only hydromagnesite; no eitelite was detected. This shows that washing can be used to enhance Na recycling in the process.

The analysis of the solution obtained after the first washing (table below) showed it to have a high pH and to contain about 4000 mg/L of Na and 637 mg/L of Si, the other elements being present in much smaller amounts. On this basis, the solution was estimated to contain about 23 milimoles/liter of sodium metasilicate ($Na_2SiO_3$) and 130 milimoles/liter of sodium hydroxide (NaOH), possibly also including some carbonate ions.

| In mg/l (elements) | Si | Ca | Mg | K | Na | S | Cr |
|---|---|---|---|---|---|---|---|
| Washing 1 | 637.5 | 0.299 | 0.267 | 4.1 | 4000 | 1.38 | 28.4 |

EXAMPLE 10

Hydromagnesite Formation at 60° C.

1 L of a 50 g/L slurry of product X was prepared and poured into a 2 L autoclave. The system was closed and 1 L of pure $CO_2$ at 10 bars was added without purging the residual air, after which the slurry was stirred and heated up to 60° C. (which roughly corresponds to the dew point of exhaust gases in a cement plant). After 2 hours the pressure dropped to close to atmospheric and heating of the autoclave was stopped. The next day, the slurry was filtered and dried overnight at 110° C. XRD revealed hydromagnesite as the main crystalline product.

EXAMPLE 11

Formation of Magnesite as Main Product at 120° C.

The procedure of Example 10 was repeated but at 120° C. (a typical temperature for exhaust gases from a cement plant) using the same autoclave, and adding $CO_2$ each time the pressure dropped close to two bars (the equilibrium water vapour pressure at 120° C.). Three additions of $CO_2$ up to 10 bars were made in the space of one day. XRD on the dried solid revealed magnesite ($MgCO_3$) to be the main product, but also showed some traces of magnetite ($Fe_3O_4$). ICP analysis of the aqueous phase showed 90% leaching of Na. The combined $CO_2$ content in the solids was analysed by means of a high-frequency induction furnace coupled to a Horiba EMIA-820V gas analyser and showed that the amount of $MgCO_3$ present accounted for about 47% of the original Mg in Product X.

EXAMPLE 12

Selective Separation of Chromium by Reduction in Solution

Powdered product X was stirred with deionised water for 15 minutes at a 2:1 Water:solids mass ratio. The yellow-coloured aqueous phase was filtered and a sample taken for ICP analysis. Excess ferrous sulfate ($FeSO_4$), a reducing agent, was then added in powder form to the solution, after which a chromium-containing precipitate formed. The liquid was again filtered, giving a colourless solution which was again analysed by ICP. The chromium content of the yellow-coloured aqueous phase was 772 mg/L. The colourless solution contained only 29 mg/L of chromium.

These results, when compared with the analysis of the raw materials, indicated that about 50% of the total chromium in the original raw material (olivine) was converted into a readily soluble (chromate) form by the process used to make "product X," and 96% of the Cr leached into the solution was precipitated by addition of ferrous sulfate.

EXAMPLE 13

Concentration of Hydromagnesite from the Solid Residues by Flotation

Separation tests were performed by flotation on the carbonated products produced from the application of the process to olivine and serpentine, similarly to the products shown, respectively, for experiments 5 and 7 in the table of Example 7. Combinations of sodium oleate, carboxymethylcellulose (CMC) and methyl isobutyl carbinol (MIBC) were used in the aqueous phase sequentially to disperse the solids in the form of a slurry at a solids concentration of 90 g/L.

First sodium oleate was added to the slurry and stirred for 5 minutes in a beaker in order to render carbonated particles hydrophobic. Then CMC was added to depress silicate hydrophobicity, followed by a further 5 minutes of stirring; and finally MIBC was added in order to stabilise the foam formed by air bubbling.

Air was bubbled through the treated slurry in a miniature flotation cell, and the solids carried over by the foam were collected as "concentrate." The residual solids were collected as "tailings." Results of four such experiments are presented in the table below. The $CO_2$ content was analysed by means of a high-frequency induction furnace coupled to a Horiba EMIA-820V gas analyser. The $CO_2$ contents of the concentrates were typically 3-4 times greater than those of the tailings, showing that hydromagnesite can be effectively separated by flotation in this manner.

The XRD results confirm the separation. They are expressed in a qualitative way by different symbols expressing the probability of a phase presence:
(o) not present,
(*) possibly present,
(X) definitely present,
(X+) present in abundance.

| Chemical additive (dosage, ppm) | | Test 1 | | Test 2 | | Test 3 | | Test 4 | |
|---|---|---|---|---|---|---|---|---|---|
| Sodium oleate | | 1500 | | 1000 | | 2000 | | 1000 | |
| CMC | | 200 | | 200 | | 200 | | 200 | |
| MIBC | | 20 | | 20 | | 20 | | 20 | |
| Product tested by flotation: | | Carbonated "product X" | | Carbonated "product X" | | Carbonated "product X" | | Carbonated "product XS" | |
| Results of flotation tests | | Tailings | Concentrate | Tailings | Concentrate | Tailings | Concentrate | Tailings | Concentrate |
| Components | SiO2 % | 34.1 | 17.6 | 33.7 | 18.5 | 33.8 | 22.0 | 33.3 | 16.9 |
| measured by | Fe2O3 % | 6.4 | 3.4 | 6.4 | 3.6 | 6.4 | 4.3 | 6.9 | 3.0 |
| chemical | MgO % | 34.6 | 37.2 | 34.5 | 37.2 | 33.9 | 36.9 | 29.2 | 35.9 |
| analysis | Na2O % | 2.3 | 1.3 | 2.3 | 1.4 | 2.6 | 1.3 | 2.3 | 1.2 |
| | LOI % | 22.3 | 40.0 | 22.6 | 38.9 | 22.7 | 35.1 | 26.2 | 41.6 |
| | CO2 % | 5.7 | 22.2 | 5.8 | 20.2 | 5.7 | 17.3 | 9.4 | 23.0 |
| Phases detected by XRD | Sodium magnesium silicate | 0 | 0 | 0 | 0 | 0 | 0 | 0 | 0 |
| | Periclase | X | * | X | * | X | * | * | * |
| | Olivine | X | * | X | * | X | * | 0 | 0 |
| | Hydromagnesite | X | X+ | X | X+ | X | X+ | X | X+ |

EXAMPLE 14

Ground natural talc from Luzenac (France) with nominal composition $Mg_3Si_4O_{10}(OH)_2$ and containing some minor impurities (1.1% $Al_2O_3$, 0.9% $Fe_2O_3$ and 0.9% CaO by mass) was mixed with anhydrous sodium carbonate ($Na_2CO_3$) at a 4863:5136 mass ratio (molar ratio approximately 1:1). The composition was chosen in order to obtain an atomic ratio of 2:1 Na:Si in the final sample. 20.5 g of this powder was pressed into a pellet and placed into a lab furnace in a platinum crucible. The sample was heated at 900° C. for 1 hour, followed by cooling in air. It was weighed before and after treatment and the measured loss on ignition of 23.3% was consistent with evaporation of carbon dioxide from the sodium carbonate plus bound water from the talc; it represents about 95% of the theoretical value for complete reaction of 24.6%. The phase constitution of the reacted sample was determined by X-ray diffraction: the main products detected were $Na_2MgSiO_4$ and $Na_2SiO_3$.

EXAMPLE 15

A sample of Product X was leached in water following a procedure similar to that given in example 9. After drying at 105° C., the powdered material (which had an ignition loss of 8.9%), was analyzed by X-ray fluorescence for its major elements, and found to contain 28.1% $SiO_2$, 39.1% MgO and 17.9% $Na_2O$. An X-ray diffraction analysis showed that the main crystalline compounds present in the powder were periclase (MgO), sodium magnesium orthosilicate ($Na_2MgSiO_4$) and forsterite olivine ($Mg_2SiO_4$); but it was known also to contain amorphous magnesium silicate hydrates (M-S—H). 5 parts of this material were mixed manually with 1 part of deionised water in a rubber bowl, using spatula. 7 g aliquots of the resulting paste were compressed in a cylindrical mould at a load of 3 tonnes to give cylindrical pellets 19 mm in diameter and 10 mm in height. These pellets were subject to curing in a flow of pure $CO_2$ gas at atmospheric pressure in a chamber at 20±2° C. Two different humidity conditions were tested: dry (i.e. no water added to the gas stream); and wet (in which the gas stream was bubbled through water at the bottom of the curing chamber before passing over the pellets). The uptake of $CO_2$ and/or water by the pellets was followed by taking them out quickly and weighing them once a day. The experiment was stopped after one week, as the weight increases had begun to level off. At this point, the pellets carbonated under dry conditions had gained 3.0% and all four of the pellets tested gave essentially identical weight changes. On the other hand, the pellets carbonated under wet conditions (close to 100% relative humidity) showed a wider pellet-to pellet variation in weight increase, with a mean of 7.8% and a standard deviation of about 1%.

It was notable that all of the pellets that had been carbonated under one atmosphere of $CO_2$ became superficially much harder than companion pellets that had simply been stored in air. The pellets carbonated under humid conditions also showed a considerable amount of efflorescence. A sample of this efflorescence was scraped off and analyzed by X-ray diffraction. It was found to contain nesquehonite ($MgCO_3.3H_2O$), nahcolite ($NaHCO_3$), trona ($Na_3H(CO_3)_2.2H_2O$), and sodium carbonate mono-hydrate ($Na_2CO_3.H_2O$). The wet-carbonated pellets themselves, analyzed by the same technique, showed the presence of primarily of periclase (MgO), sodium magnesium orthosilicate ($Na_2MgSiO_4$), olivine ($Mg_2SiO_4$) and nesquehonite ($MgCO_3.3H_2O$). It thus appears that nesquehonite was the main "binder" phase and that it was probably produced to a significant extent by carbonation of M-S—H.

Pairs of treated and untreated pellets were compressed to failure in a compression machine. The results are summarized in the table below:

| Curing regime applied to pressed pellets | Compressive loads at failure, kN, (for 2 pellets) |
| --- | --- |
| Stored in air | 3.0; 3.2 |
| Carbonated under humid conditions | 11.5; 18.5 |
| Carbonated under dry conditions | 36.0; 36.7 |

It is clear that the atmospheric-pressure carbonation process greatly increased the strength of the pellets, and that carbonation under dry conditions was preferable to carbonation under humid conditions.

The invention claimed is:

1. A process for the treatment of a silicate mineral, said process comprising:
   preparing a first composition comprising an alkali metal magnesium orthosilicate and optionally either (i) magnesium oxide or (ii) an alkali metal silicate, by reaction, at a temperature from 600° C. to 1000° C., of an alkali metal carbonate compound, which compound is an alkali metal carbonate, an alkali metal bicarbonate or a mixture thereof, with a magnesium silicate, the molar ratio of alkali metal carbonate compound, expressed as alkali metal oxide of the formula $R_2O$, in which R represents an alkali metal, to magnesium silicate, expressed as silicon dioxide, of the formula $SiO_2$, being from 4:1 to 1:4, wherein the reaction is obtained by contacting the alkali metal carbonate compound and the magnesium silicate to each other in a solid state, and
   contacting the first composition with water to produce a second composition comprising an amorphous magnesium silicate hydrate (M-S—H).

2. A process according to claim 1, wherein M-S—H is represented by an oxide formula in the form $pMgO.SiO_2.qH_2O$ where p is from 0.5 to 2.0 and q is from 1 to 4.

3. A process according to claim 1, wherein the magnesium silicate is a magnesium silicate in which the molar ratio of magnesium oxide to silica is from 0.5 to 3.

4. A process according to claim 1, wherein the magnesium silicate comprises a magnesium silicate rock comprising a magnesium silicate of general composition:

$m(MgO).t(QO).SiO_2.xH_2O$ wherein m is from 0.5 to 3, t is less than or equal to 1, x is from zero to 2, and Q represents a metal or metals other than magnesium.

5. A process according to claim 4, wherein Q represents iron, nickel and/or chromium which process further comprises isolating an iron, nickel and/or chromium compound.

6. A process according to claim 1, further comprising isolating or producing magnesium oxide, magnesium hydroxide or an alkali metal silicate from the second composition.

7. A process according to claim 1, further comprising a step in which the second composition is carbonated to produce a third composition comprising a magnesium carbonate compound.

8. A process according to the claim 7, further comprising a step in which the magnesium carbonate from the third composition is calcined to produce a fourth composition comprising magnesium oxide.

9. A process according to claim 7, wherein the carbonation of the second composition is conducted in a second substep, after a first substep during which the second composition is formed by molding or pressing to form a shaped article, such that a carbonated shaped article is obtained.

10. A process according to claim 1, wherein the temperature is from 800 to 1000° C.

* * * * *